(12) United States Patent
Anctil et al.

(10) Patent No.: US 7,455,518 B2
(45) Date of Patent: Nov. 25, 2008

(54) INJECTION MOLDING

(75) Inventors: Albert R. Anctil, Perrysburg, OH (US);
Richard L. Allen, Sylvania, OH (US);
Tasadduq Hussain, Maumee, OH (US)

(73) Assignee: Rexam Prescription Products Inc., Perrysburg, OH (US)

( * ) Notice: Subject to any disclaimer, the term of this patent is extended or adjusted under 35 U.S.C. 154(b) by 0 days.

(21) Appl. No.: 11/707,400

(22) Filed: Feb. 16, 2007

(65) Prior Publication Data

US 2007/0154590 A1   Jul. 5, 2007

Related U.S. Application Data

(62) Division of application No. 10/768,331, filed on Jan. 30, 2004, now Pat. No. 7,214,341.

(51) Int. Cl.
*B29C 45/14* (2006.01)
*B29C 45/84* (2006.01)

(52) U.S. Cl. .................. 425/577; 425/533; 425/589; 425/DIG. 58

(58) Field of Classification Search .............. 425/441, 425/533, 525, 577, 589, 556, 438, 553, 522, 425/809, 813, 537, DIG. 58, DIG. 27; 264/537, 264/318, 328.1, 334
See application file for complete search history.

(56) References Cited

U.S. PATENT DOCUMENTS

| 2,532,729 | A | | 12/1950 | Millstein |
| 2,860,374 | A | * | 11/1958 | Harrison et al. ............. 425/422 |
| 2,891,283 | A | * | 6/1959 | Chabotte et al. ............. 249/59 |
| 2,966,702 | A | * | 1/1961 | Soubier ...................... 264/520 |
| 2,984,865 | A | | 5/1961 | Mumford |
| 3,032,810 | A | * | 5/1962 | Soubier ...................... 264/539 |
| 3,052,916 | A | * | 9/1962 | Campbell .................... 264/539 |
| 3,264,684 | A | * | 8/1966 | Moslo ......................... 425/525 |
| 3,700,133 | A | | 10/1972 | Bagguley |
| RE27,673 | E | | 6/1973 | Landen |

(Continued)

FOREIGN PATENT DOCUMENTS

EP    0058815    9/1982

(Continued)

OTHER PUBLICATIONS

U.S. Appl. No. 10/768,331, filed Jan. 30, 2004 Office Action mailed May 15, 2006.

(Continued)

*Primary Examiner*—Philip C Tucker
*Assistant Examiner*—Seyed Masoud Malekzadeh
(74) *Attorney, Agent, or Firm*—Reising, Ethington, Barnes, Kisselle, P.C.

(57) ABSTRACT

A method and apparatus for injection molding an article including a radially extending child resistant feature. Finish block halves are provided that include a pocket and that are closable together to form a neck-finish mold cavity. Mold body halves are provided that include a core portion and that are closable together to form a body mold cavity. The core portion is advanceable toward the pocket to cooperate therewith to define a cavity for forming the child resistant feature. The core portion may be integrally formed into one or more of the mold body halves, or may be separately mounted and relatively movable with respect thereto.

6 Claims, 3 Drawing Sheets

U.S. PATENT DOCUMENTS

| | | | |
|---|---|---|---|
| 3,737,277 A | 6/1973 | Uhlig | |
| 3,744,655 A | 7/1973 | Nixdorff, Jr. | |
| 3,759,652 A | 9/1973 | Childs et al. | |
| 3,843,088 A * | 10/1974 | McLoughlin et al. | 249/144 |
| 3,857,660 A | 12/1974 | Flynn et al. | |
| 3,868,202 A * | 2/1975 | Valyi | 425/525 |
| 3,884,379 A | 5/1975 | Landon | |
| 3,904,165 A | 9/1975 | Den Boer | |
| 3,905,740 A * | 9/1975 | Lovejoy | 425/438 |
| 3,929,954 A * | 12/1975 | Valyi | 264/513 |
| 3,939,788 A | 2/1976 | Schneible | |
| 3,941,539 A * | 3/1976 | Saumsiegle et al. | 425/525 |
| 4,013,748 A * | 3/1977 | Valyi | 264/513 |
| 4,036,385 A | 7/1977 | Morris | |
| 4,054,630 A | 10/1977 | Wang | |
| 4,057,609 A * | 11/1977 | Uhlig | 264/530 |
| 4,065,246 A * | 12/1977 | Marcus | 425/528 |
| 4,077,759 A * | 3/1978 | Saumsiegle et al. | 425/451 |
| 4,099,639 A | 7/1978 | Boxer et al. | |
| 4,103,797 A | 8/1978 | Morris | |
| 4,125,246 A | 11/1978 | Von Holdt | |
| 4,133,627 A * | 1/1979 | Kontz | 425/525 |
| 4,180,175 A | 12/1979 | Virog et al. | |
| 4,201,535 A * | 5/1980 | Ninneman | 425/548 |
| 4,225,303 A | 9/1980 | Crisci | |
| 4,233,021 A | 11/1980 | Spurr | |
| 4,277,232 A | 7/1981 | Taluba et al. | |
| 4,290,745 A | 9/1981 | Kontz | |
| 4,317,793 A | 3/1982 | Hubert et al. | |
| 4,432,530 A * | 2/1984 | Marcinek | 249/142 |
| 4,476,083 A | 10/1984 | Von Holdt | |
| 4,570,897 A * | 2/1986 | Von Holdt | 249/144 |
| 4,648,834 A * | 3/1987 | Von Holdt | 425/556 |
| 4,687,112 A | 8/1987 | Swartzbaugh | |
| 4,753,591 A * | 6/1988 | Maes et al. | 425/525 |
| 4,844,405 A * | 7/1989 | Sorensen | 249/124 |
| 4,929,410 A * | 5/1990 | Meyer et al. | 264/533 |
| 4,941,815 A | 7/1990 | Julian | |
| 5,038,454 A * | 8/1991 | Thornock et al. | 29/451 |
| 5,078,288 A | 1/1992 | Fuchs | |
| 5,176,871 A * | 1/1993 | Fukai | 264/348 |
| 5,232,718 A | 8/1993 | Miyazawa et al. | |
| 5,340,304 A * | 8/1994 | Nakamura | 425/577 |
| 5,368,469 A | 11/1994 | Ekkert | |
| 5,447,766 A * | 9/1995 | Orimoto et al. | 428/36.91 |
| 5,460,281 A | 10/1995 | Rapchak et al. | |
| 5,462,182 A | 10/1995 | Opresco | |
| 5,507,998 A * | 4/1996 | Yokobayashi | 264/532 |
| 5,599,567 A * | 2/1997 | Gellert | 425/526 |
| 5,662,245 A | 9/1997 | Grant | |
| 5,688,570 A * | 11/1997 | Ruttinger, Sr. | 428/35.7 |
| 5,705,112 A * | 1/1998 | Gram | 264/242 |
| 5,727,703 A | 3/1998 | Fuchs | |
| 5,736,173 A * | 4/1998 | Wright et al. | 425/577 |
| 5,776,518 A * | 7/1998 | Wohlgemuth | 425/182 |
| 5,840,350 A * | 11/1998 | Salemi | 425/533 |
| 5,899,348 A | 5/1999 | Konefal et al. | |
| 6,039,195 A | 3/2000 | Konefal et al. | |
| 6,116,891 A | 9/2000 | Starkey | |
| 6,190,599 B1 * | 2/2001 | Sorensen et al. | 264/318 |
| 6,327,770 B1 | 12/2001 | Konefal et al. | |
| 6,375,890 B1 * | 4/2002 | Salemi | 264/523 |
| 6,402,503 B1 | 6/2002 | Hickman | |
| 6,569,370 B1 * | 5/2003 | Amin et al. | 264/219 |
| RE38,396 E * | 1/2004 | Gellert | 29/411 |
| 6,887,418 B2 * | 5/2005 | Olaru et al. | 264/328.1 |
| 6,989,124 B2 * | 1/2006 | Miller et al. | 264/318 |
| 7,303,387 B2 * | 12/2007 | Hutchinson et al. | 425/547 |
| 2002/0166834 A1 | 11/2002 | Branson et al. | |
| 2003/0107155 A1 * | 6/2003 | Olaru et al. | 264/328.1 |
| 2004/0119206 A1 * | 6/2004 | Howlett | 264/335 |
| 2004/0151937 A1 * | 8/2004 | Hutchinson et al. | 428/542.8 |
| 2005/0136150 A1 * | 6/2005 | Martin | 425/556 |

FOREIGN PATENT DOCUMENTS

| | | |
|---|---|---|
| EP | 0074246 | 3/1983 |
| EP | 0479139 A2 | 4/1992 |
| EP | 1180424 A1 | 2/2002 |
| JP | 56089923 | 7/1982 |
| JP | 57140128 | 8/1982 |
| WO | WO 83/02262 | 7/1983 |
| WO | WO 88/10218 | 12/1988 |
| WO | WO 89/07554 | 8/1989 |
| WO | WO 2005/075175 A1 | 8/2005 |

OTHER PUBLICATIONS

U.S. Appl. No. 10/768,331, filed Jan. 30, 2004 Final Office Action mailed Nov. 2, 2006.

PCT Int'l Application No. PCT/US2005/002711 Publication No. WO 2005/075175 A1 Amendment and Response to Written Opinion dated Aug. 25, 2005.

PCT Int'l Application No. PCT/US2005/002711 Publication No. WO 2005/075175 A1 International Preliminary Report on Patentability dated May 23, 2006.

* cited by examiner

INJECTION MOLDING

This application is a division of application Ser. No. 10/768,331 filed Jan. 30, 2004, now U.S. Pat No. 7,214,341.

FIELD OF THE INVENTION

Reference is made to U.S. Ser. Nos. 10/378,434 and 10/386,192, both assigned to the assignee of the present application, and both incorporated herein by reference.

This invention relates generally to a method and apparatus for injection molding and more particularly to a method and apparatus for injection molding a plastic preform for subsequent blow molding into a container having a cantilevered release element.

BACKGROUND OF THE INVENTION

Child resistant features are widely sought for medicine containers, poison containers, and yet undiscovered applications. One type of child resistant feature is particularly popular for rigid bottles that are injection molded, as typified by U.S. Pat. No. 6,039,195 to Konefal et al. Konefal et al. disclose a container having an open upper end and external threads formed on a neck finish proximate the open upper end. Just below the threads, a deflectable release element is integrally formed on the container. The release element extends radially outwardly from the neck finish and defines an open space between the release element and the neck finish. The release element ordinarily engages lugs formed in a closure member of the container to resist removal of the closure member by a child, unless the release element is pressed radially inwardly and/or axially downwardly. The release element is easily manufactured using a regular injection molding process.

However, many types of useful articles are produced by single stage or multi-stage injection blow molding (IBM) process. Such articles could benefit from incorporation of the above-described child resistant features. IBM processes typically involve thermoplastic materials, such as high density polyethylene, polypropylene, polyethylene terephthalate, and the like. IBM apparatuses for molding such articles typically include a mold assembly having a core pin that inserts within a pair of mold halves that are split longitudinally, and that open and close together in a direction that is transverse with respect to a longitudinal axis of the core pin. Accordingly, the core pin and closed mold halves cooperate to define a mold cavity that corresponds in size and shape to the desired size and shape of the article being molded. A suitable thermoplastic resin is injected into the mold assembly through a gate at one end of the closed assembly to fill the mold cavity and thereby form the article.

Unfortunately, however, the release element of the above-described child resistant container is difficult to manufacture using current injection blow molding processes and apparatuses, because the release element can be damaged when the mold halves retract away from each other. In other words, the non-symmetrical and relatively complex geometry between the release element and the container renders it impossible to quickly extract the container from the molds without some type of damage to the release element.

SUMMARY OF THE INVENTION

A method of injection molding an article is provided according to the present invention, and includes the following steps: providing finish blocks; closing the finish blocks together to form a neck-finish mold cavity; providing a plurality of mold bodies; closing the mold bodies together to form a body mold cavity; providing a core portion one at least one of finish blocks and mold bodies; providing a pocket in at least one of the finish blocks and mold bodies; and advancing the core portion toward the pocket, whereby the core portion cooperates with the pocket to define a cavity for forming a radially extending element of the article. Articles produced by the method are also contemplated by the present invention.

An apparatus for injection molding an article is provided according to the present invention. The apparatus includes finish blocks that define a neck-finish mold cavity, and includes mold bodies that define a mold cavity. The apparatus further includes a core portion on at least one of the finish blocks and mold bodies, and a pocket in at least one of the finish blocks and mold bodies. The core portion is movable toward the pocket whereby the core portion and pocket cooperate to define a cavity for injection molding a radially extending element of the article.

Objects, features, and advantages of this invention include providing an injection blow molding apparatus and method for injection blow molding articles that minimizes the possibility of damaging the article as separable mold halves open and close with respect to one another and as articles are removed from the mold halves. Accordingly, a widely popular child resistant feature can now be provided on injection blow molded articles.

BRIEF DESCRIPTION OF THE DRAWINGS

These and other objects, features and advantages of this invention will be apparent from the following detailed description of the preferred embodiments and best mode, appended claims, and accompanying drawings in which:

DETAILED DESCRIPTION OF THE PREFERRED EMBODIMENTS

Figure 1:
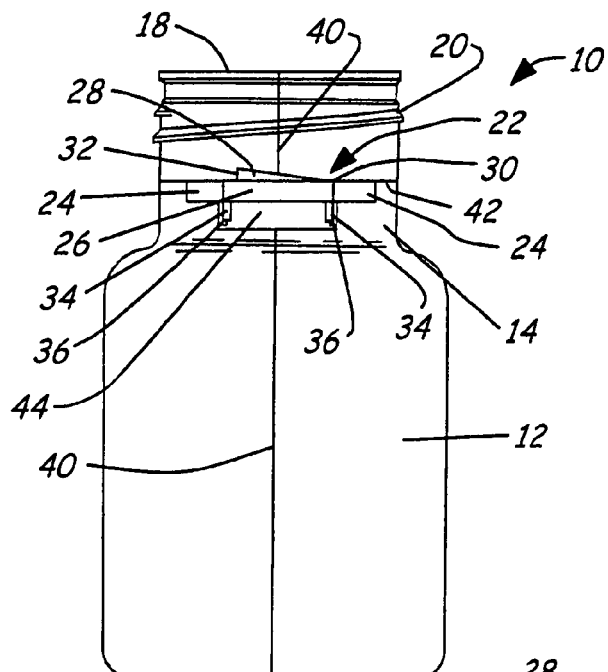
FIG. 1 is a front view of a child resistant container embodying the present invention.
Figure 2:
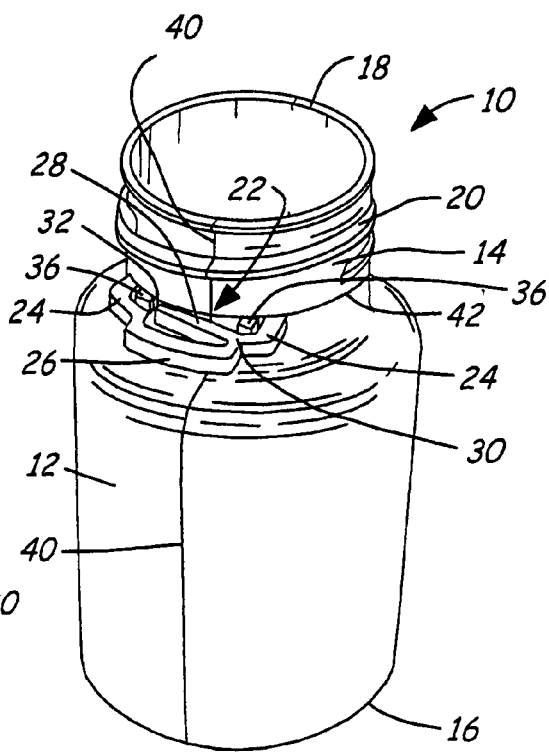
FIG. 2 is a perspective view of the child resistant container of FIG. 1.
Figure 3:
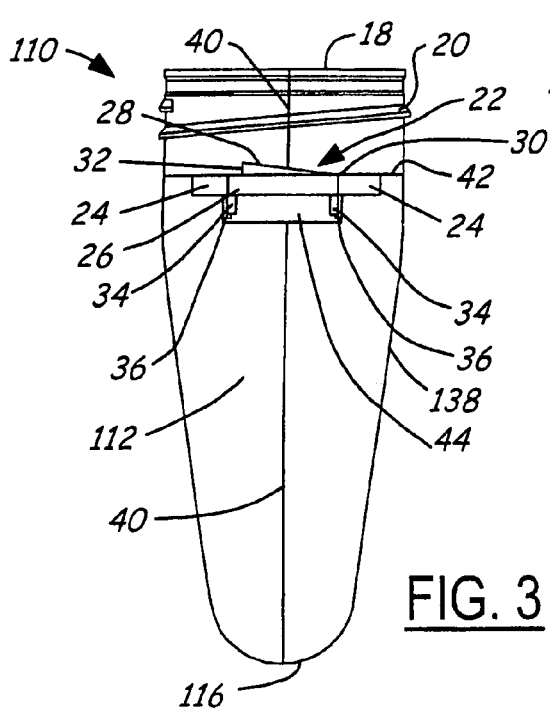
FIG. 3 is a front view of a preform for the child resistant container of FIG. 1, embodying the present invention.

Referring in detail to the drawings, FIGS. 1 and 2 illustrate a container 10 and FIG. 3 illustrates a container preform 110. The container preform 110 is injection molded and the body 112 thereof subsequently blow molded to form the container 10 with an expanded body 12.

The container 10 and preform 110 are composed of polymeric material, such as homopolymer polypropylene, copolymer polypropylene, polyethylenes, polyethylene terephthalate, and the like. The container 10 and preform 110 generally include the bodies 12, 112 and a neck finish 14 extending therefrom. The container 10 is generally hollow and cylindrical with a longitudinal axis that runs through closed lower ends 16, 116 of the bodies 12, 112 and an open upper end 18 of the neck finish 14. The container 10 is also generally symmetrical along its longitudinal axis, with the exception of external threads 20 and a deflectable closure release 22 that are integrally formed on the neck finish 14.

The closure release 22 is integrally connected to the container by circumferentially spaced horizontal flexible and resilient arms 24 that are integrally connected by a depressible bar 26. An open space is defined between the depressible bar 26 and the neck finish 14 of the containers 10, 110, and a cantilevered lug 28 extends from a flexible hinge portion 30 of the depressible bar 26 and terminates in an axial stop surface 32. The cantilevered lug 28 extends in a tangential, circumferential, or arcuate direction with respect to the outer diameter of the neck finish 14 and extends in the same direction as the direction of rotation of a closure member (not shown), which threads closed onto the neck finish 14 of the container 10. The cantilevered lug 28 of the closure release 22 ordinarily engages lugs (not shown) formed in the closure member to resist removal of the closure member by a child, unless the depressible bar 26 of the closure release 22 is pressed radially inwardly and/or axially downwardly to pull the cantilevered lug 28 downwardly and thereby disengage the axial stop surface 32 of the cantilevered lug 28 from the lugs of the closure.

The neck finish 14 and closure release 22 includes a positive stop to prevent over-deflection of the depressible bar 26. The positive stop is defined by a pair of circumferentially spaced tab feet 34 (not shown in FIG. 2) and tab stops 36. The tab feet 34 extend longitudinally downward from the bottom of the depressible bar 16. The tab stops 36 extend longitudinally downwardly along the neck finish 14 from proximate the top surfaces of the resilient arms 24. When the depressible bar 26 is depressed, the cantilevered lug 28 gets deflected axially downwardly. However, if excessive force is used, then the tab feet 34 will engage the tab stops 36 to prevent deflection of the closure release 22 further than necessary to disengage the cantilevered lug 28. The release 22 is similar to that on the child resistant container of U.S. Pat. No. 6,039,195 (the '195 patent), which is incorporated by reference herein.

There are, however, several differences between the container 10 and preform 110 of the present invention and the child resistant container of the '195 patent. For example, the container 10 is an injection blow molded article, whereas the container of the '195 patent is simply injection molded. The container preform 110 is a preformed article or parison, which is injection molded prior to being blow molded. Also, the container 10 and preform 110 include a longitudinal parting line 40 and a transverse parting line 42 that intersect at the closure release 22. Finally, the container 10 and preform 110 include a smooth pad 44 (not shown in FIG. 2) on the neck finish 14 proximate the closure release 22, wherein the longitudinal parting line 40 is interrupted. This interruption in the longitudinal parting line 40 will be explained in further detail below in reference to the methods and apparatuses of the present invention.

Figure 4A:
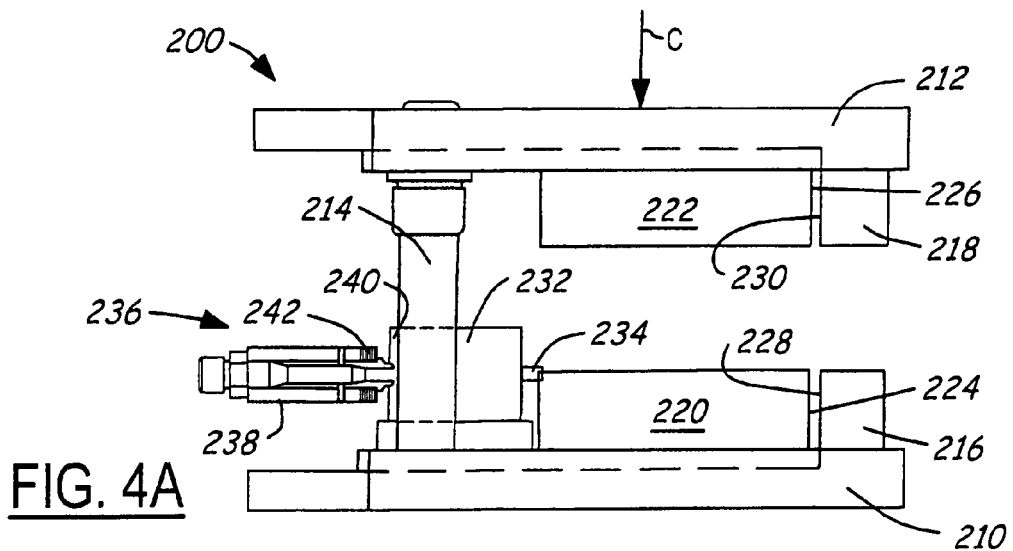
FIG. 4A is a front elevational view of an apparatus for producing the preform of FIG. 3 that illustrates mold body halves and neck finish mold halves being closed together, according to an embodiment of the present invention.

Referring now to FIG. 4A, an injection molding apparatus 200 includes a die set generally defined by a lower die plate 210, an upper die plate 212, and a die shaft 214 connected therebetween as is well known in the art. Various other well-known features, such as die springs, die pins, and the like are not shown for the sake of clarity and focus on the present invention. The injection molding apparatus 200 further includes a lower neck ring or finish block 216 and an upper neck ring or finish block 218 fixedly mounted to the lower die plate 210 and upper die plate 212 respectively, as is well-known in the art. In contrast, however, a lower mold body 220 and an upper mold body 222 are slidably mounted to the lower and upper die plates 210, 212 respectively. One or both of the mold bodies 220, 222 include special axial features at forward ends 224, 226 thereof, as will be discussed in further detail below. Likewise, one or both of the finish blocks 216, 218 include complementary special axial features at rearward ends 228, 230 thereof, as will also be described in detail below.

In any case, the mold bodies 220, 222 may be slidably mounted in any manner including using tongue and groove or dovetail features, mounting secondary sliding subplates between the mold bodies and die plates, attaching pillow blocks and guide rails therebetween, any combination of the foregoing arrangements, or any other suitable sliding means. Similarly, a manifold block 232 and a mold nozzle 234 are slidably mounted to the lower die plate 220. Finally, a main nozzle 236 is fixedly mounted on the injection molding machine (not shown), as is well known in the art. The main nozzle 236 includes a nozzle body 238, a spring loaded nozzle 240, and a series of springs 242 therebetween, such as Bellville washers, or the like. As is well known in the art of injection molding, a core pin (not shown) is generally provided between the mold bodies 220, 222 and finish blocks 216, 218 to define the interior of the preform container to be formed.

Figure 4B:
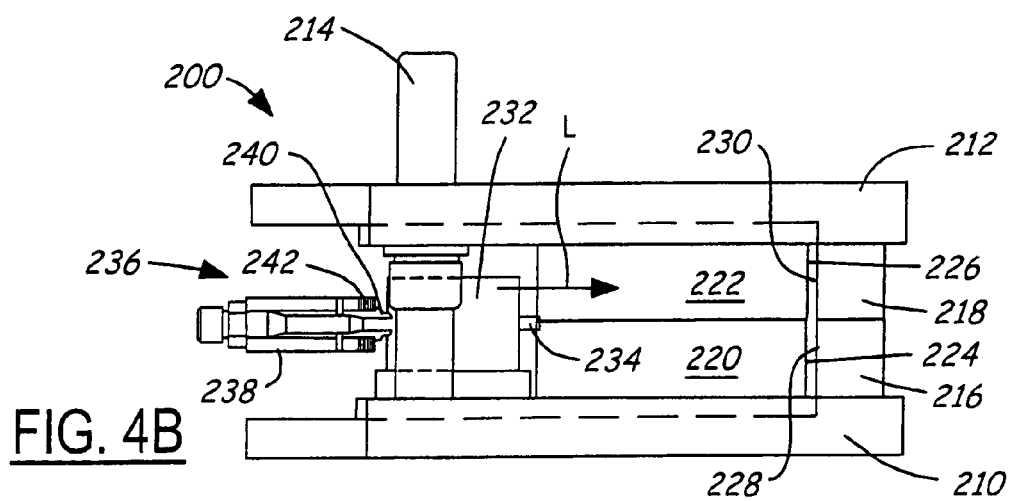
FIG. 4B is a front elevational view of the apparatus of FIG. 4A, illustrating the mold body halves being longitudinally advanced toward the neck finish mold halves.
Figure 4C:
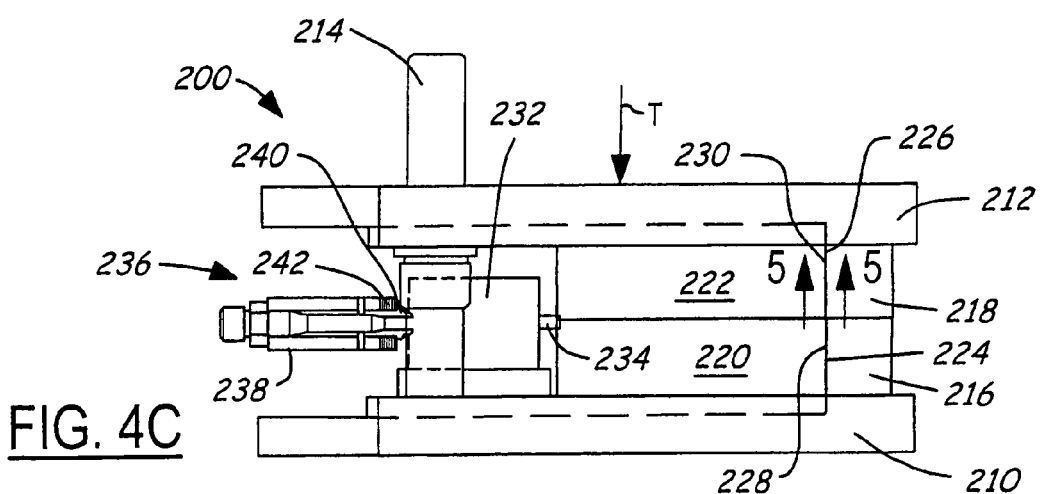
FIG. 4C is a front elevational view of the apparatus of FIG. 4A, further illustrating clamp tonnage being applied.

Referring to FIGS. 4A-4C, the apparatus operates according to the following method. Die clamps (not shown) of the injection molding machine (not shown) apply transverse or downward pressure on the upper die plate 212, as depicted by arrow C of FIG. 4A. This downward pressure urges the upper die plate 212 toward the lower die plate 210, thereby closing together the upper and lower mold bodies 222, 220 and the upper and lower finish blocks 218, 216 as shown in FIG. 4B. Also, as depicted by arrow L in FIG. 4B, the mold bodies 220, 222 and the manifold block 232 are advanced horizontally or longitudinally toward the finish blocks 216, 218 such as by a pneumatic or hydraulic cylinder, rotary actuator, driving wedge, or the like (not shown). And, even though the nozzle body 238 remains fixed, the spring loaded nozzle 240 stays in contact with the manifold block 232 by virtue of the spring force applied by the springs 242.

Accordingly, the mold bodies 220, 222 contact the finish blocks 216, 218, as shown in FIG. 4C. The longitudinal parting line 40 of FIGS. 1-3 is defined by the mating surface contact of the upper and lower mold bodies 222, 220 and the upper and lower finish blocks 218, 216. Next, clamp tonnage is applied to the upper die plate 212 by the injection molding machine, as depicted by arrow T in FIG. 4C. Molten plastic is then injected through the main nozzle 236, manifold block 232, mold nozzle 234, and into the mold bodies 220, 222 and finish blocks 216, 218 to form the preform container 110 of FIG. 3. Thereafter, the clamp tonnage is released, the mold bodies 220, 222 are retracted longitudinally back away from the finish blocks 216, 218, the die clamps release, and the upper die plate 212 returns to its home position as shown in FIG. 4A. Accordingly, the preform container 110 of FIG. 3 can then be removed from the mold without distorting, flexing, or breaking the closure release 22. Thereafter, the preform container 110 is transferred to a blow mold (not shown) where the body 112 of the preform container 110 is blown to form the body 12 of the finished injection blow molded container 10.

Figure 5:
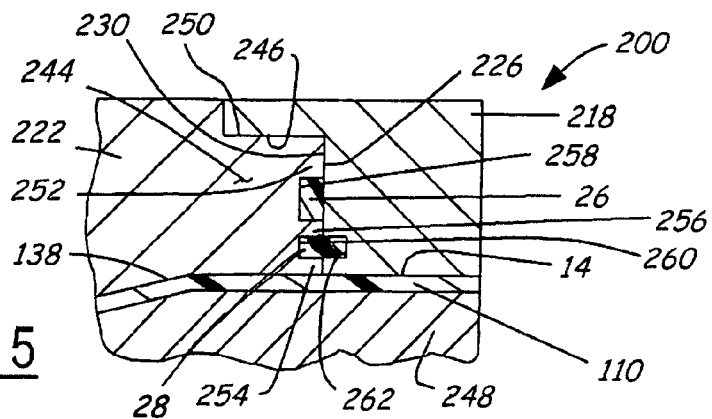
FIG. 5 is a partial cross-sectional view of the apparatus of FIG. 4C taken along line 5-5, wherein the preform of FIG. 3 is also shown as molded in place within the apparatus.

FIG. 5 is a partial cross-sectional view of the tooling apparatus 200 of FIG. 4C that is taken along line 5-5. FIG. 5 illustrates the special axial features that were referred to above, and that are defined by specific elements as will be discussed below. The axial features are provided in the forward end 226 of the upper mold body 222 and in the rearward end 230 of the upper finish mold 218, as briefly mentioned above with respect to FIG. 4A. The axial features are also provided in the lower mold body (not shown) and the lower finish block (not shown), which are not captured by the cross-section along lines 5-5. Nonetheless, reference will be made to the mold bodies 220, 222 and the finish blocks 216, 218 even though only one each is shown in FIG. 5.

The axial features cooperate with one another to at least partially form portions of the closure release 22 of the container 10 and preform 110 of FIGS. 1-3. Essentially, the axial features are defined by a molding surface or core 244 and a pocket 246. In the method described above, when the mold bodies 220, 222 are advanced longitudinally forward toward the finish blocks 216, 218, the core 244 enters the pocket 246 to at least partially define a cavity for forming the closure release 22 of FIGS. 1-3. Also, the transverse parting line 42 of FIGS. 1-3 is defined by the mating surface contact of the forward ends 224, 226 of the mold bodies 220, 222 with the rearward ends 228, 230 of the finish blocks 216, 218.

FIG. 5 depicts a portion of the preform 110 formed between a core pin 248 and mold bodies 220, 222 and finish blocks 216, 218. The preform 110 includes the tapered profile 138 (in the example shown), neck finish 14, depressible bar 26, and cantilevered lug 28.

FIG. 5 also shows the mold bodies 220, 222 having an external pilot surface 250 of the core 244 that cooperates with an internal pilot surface or the pocket 246 of the finish blocks 216, 218. The core 244 includes a radially outward male feature 252, a radially inward male feature 254, and central male feature 256 therebetween. Similarly, the core 244 includes a radially outward female feature 258 for at least partially forming the depressible bar 26 of the containers of FIGS. 1-3, and the core 244 further includes a radially inward female feature 260 for at least partially forming the cantilevered lug 28 of the containers 10, 110 of FIGS. 1-3. Likewise, the pocket 246 of the finish blocks 216, 218 is further defined by a female feature 262 for at least partially forming the cantilevered lug 28. Accordingly, the core 244 cooperates with the pocket 246 to define the closure release 22 and the spaces between the neck finish 14 and the closure release 22 of the container 10 and preform 110 of FIGS. 1-3.

After the molten plastic is injected into the mold and the closure release member is formed, the mold bodies 220, 222 must axially retract such that the male features 252, 254, 256 axially clear the newly formed closure release 22 and spaces, and such that the entire core 244 axially clears the pocket 246 of the finish blocks 216, 218. Only thereafter may the mold bodies 220, 222 retract transversely with respect to the longitudinal axis of the mold and preform container. Thus, the present invention enables efficient injection molding of a closure release member on an injection blow molded container.

Figure 6:
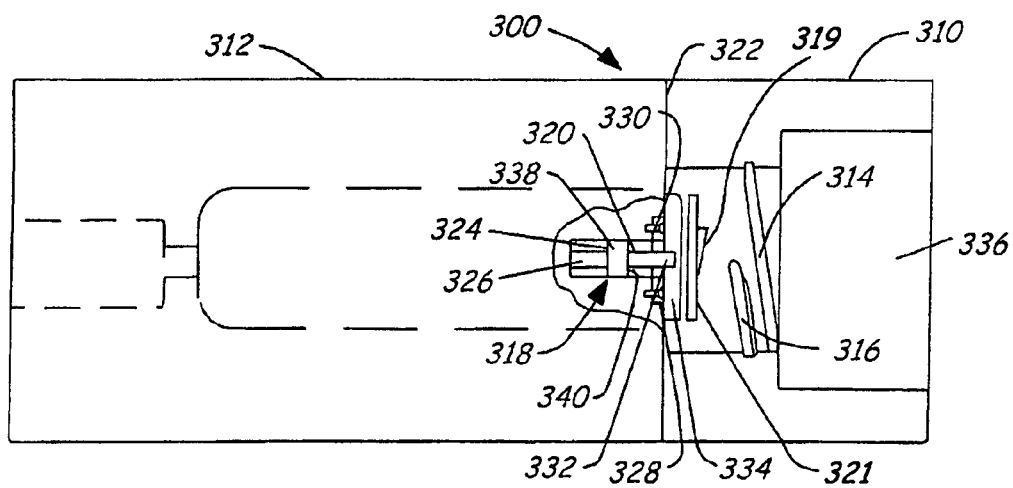
FIG. 6 is a partially broken out top view of an apparatus for producing the preform of FIG. 3, according to an alternative embodiment of the present invention.
Figure 7:
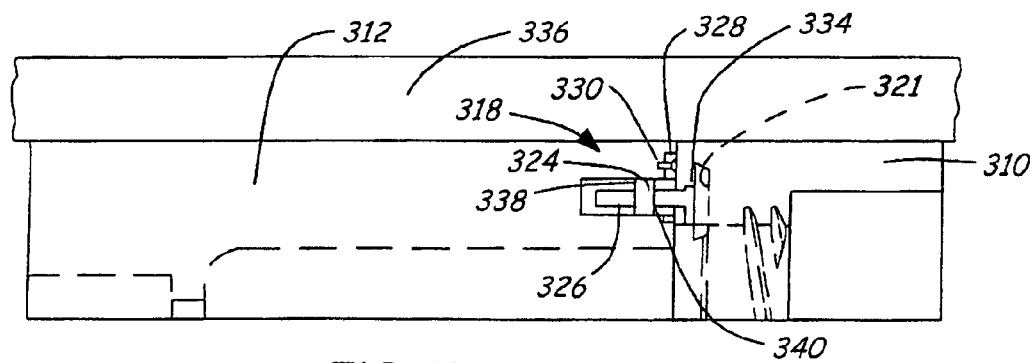
FIG. 7 is a front elevational view of the apparatus of FIG. 6.

FIGS. 6-7 are directed toward an apparatus 300 according to an alternative embodiment of the present invention. FIG. 6 represents a top view of a finish block 310 and a mold body 312. The finish block 310 includes recessed threads 314, 316 for forming the threads 20 on the container 10 and preform 110 of FIGS. 1-3. The finish block 310 further includes female features 318, 320 that partially define a cavity or pocket for partially forming the closure release 22 of the container 10 and preform 110 of FIGS. 1-3.

Unlike the previously described embodiment, wherein the axial features are integrated into the mold bodies, this embodiment involves incorporating a unique actuator assembly 318 into the mold body 312. The actuator assembly 318 includes a cylinder 320 formed in a forward end 322 of the mold body 312, into which a connected piston 324 and rod 326 are disposed. A recessed retainer plate 328 is fastened over the cylinder 320 at the forward end 322 of the mold body 312 by fasteners 330 such as screws, and the like. The retainer plate 328 seals the piston 324 and rod 326 within the cylinder 320. A forward end 332 of the rod 326 is fixed to a core 334. Essentially, the core 334 includes the same or similar male and female features as the core 244 of FIG. 5, which features are not repeated in detail here. Nonetheless, the male and female features (not shown) of the core 334, together with the pocket 319, 321 of the finish block 310, are provided for forming the closure release 22 of the containers 10, 110 of FIGS. 1-3.

FIG. 7 illustrates a side view of a die plate 336 and the mold body 312 of FIG. 6, wherein the piston 324, rod 326, and core 334 have been advanced from a home position, as in FIG. 6, into an advanced position as shown here wherein the core 334 of the mold body 312 cooperates with the pocket 319, 321 of the finish block 310 to form the closure release 22 of the containers 10, 110 of FIGS. 1-3. The actuator assembly 318 may be actuated to the advanced position by any manner wherein positive fluid pressure is supplied to a rearward side 338 of the piston 324 and may be retracted or reversed by applying vacuum or a negative pressure to the rearward side 338 of the piston 324 or a positive pressure to a forward side 340 of the piston 324. Related equipment and features for the actuator assembly 318 such as a pump, a fluid supply, and fluid passages formed in the mold are well known in the art and, thus, are not shown here.

In general, a method is provided according to the present invention for injection molding an article. A plurality of finish blocks is provided, wherein one or more of the plurality of finish blocks includes one or more pockets. A plurality of mold bodies are provided, wherein one or more of the plurality of mold bodies includes one or more core portions that cooperate with the pockets of the plurality of finish blocks. The core portion may be integrally formed in the plurality of mold bodies, as described above with respect to FIGS. 4A-5. The core portion may also be separately attached and actuated within the plurality of mold bodies, as described above with respect to FIGS. 6-7. Other alternative core arrangements are contemplated by, and well within the scope of, the present invention. The plurality of finish blocks are then closed together to form a neck-finish mold cavity and the plurality of mold bodies are closed together to form a body mold cavity. The core portion is advanced toward the plurality of finish blocks and cooperates with the pocket to define a cavity for forming a radially extending element of the article. The core portion is retracted from out of cooperation with the pocket, before the mold bodies are separated from one another, thereby avoiding damage to the closure release of the article.

Persons of ordinary skill in the art will recognize that the above description is intended to be illustrative of a couple presently preferred embodiments of the present invention, and not limiting thereof. Modifications and substitutions may be made without departing from the spirit and broad scope of the present invention as set forth in the appended claims. For example, without limitation, the core has been shown and described as either integrally formed in both upper and lower mold bodies or independently mounted within an upper mold body. But, the core or portions thereof may be provided on more or less than two mold bodies. The above applies equally to the pocket within the finish blocks. Moreover, the mold bodies or core may traverse along directions other than just parallel with the longitudinal axis of the mold. Also, the core may be provided on the finish blocks and the pocket provided in the mold bodies. Likewise, the mold bodies may remain stationary, while the finish blocks and/or core are advanced with respect thereto. Other modifications and variations will be apparent to skilled artisans in view of this disclosure, including the claims that follow.

We claim:

1. Apparatus for injection molding an article, said apparatus comprising:
   a plurality of finish blocks that at least partially defines a neck-finish mold cavity;
   a plurality of mold bodies that at least partially defines a first mold cavity and that is disposed adjacent said plurality of finish blocks;
   a core portion on at least one of a rearward end of said finish blocks or a forward end of said mold bodies; and
   a pocket in at least one of said rearward end of said finish blocks or said forward end of said mold bodies;
   wherein said core portion is movable toward said pocket so that said core portion and said pocket cooperate to define a second mold cavity, said second mold cavity communicating with said first mold cavity for forming a closure release integrally molded with said article in said apparatus, and wherein said core portion and said pocket include cooperating male and female features to at least partially define said closure release including a depressible bar and a cantilevered lug.

2. The apparatus as set forth in claim 1, wherein said core portion is disposed in fixed position on said at least one of said plurality of mold bodies, said at least one of said plurality of mold bodies being movable toward said at least one of said plurality of finish blocks to move said core portion into said pocket to form said closure release of the article, whereby said at least one of said plurality of mold bodies is retractable to move said core portion out of said pocket.

3. The apparatus as set forth in claim 2, wherein said core portion is movably mounted to said at least one of said plurality of mold bodies for movement into said pocket to form said closure release element, whereby said core portion is retractable out of said pocket.

4. Apparatus for injection molding a plastic preform having a preform body for subsequent blow molding into a container having a container body, a neck finish and a closure release including a depressible bar and a cantilevered lug cantilevered radially outwardly from said neck finish, said apparatus comprising;
   a pair of preform finish blocks that, when brought together, form a mold cavity for said neck finish, one of said pair of preform finish blocks having a pocket at a rearward end of said pair of preform finish blocks for forming a portion of said cantilevered lug; and
   a pair of preform mold bodies that, when brought together, form a first mold cavity for the preform body, one of said pair of preform mold bodies including a core portion at a forward end of said pair of preform mold bodies that is movable into said pocket to define with said pocket a second mold cavity, said second mold cavity communicating with said first mold cavity for injection molding said cantilevered lug;
   wherein said core portion and said pocket include cooperating male and female features to at least partially define the depressible bar and the cantilevered lug of the closure release.

5. The apparatus as set forth in claim 4, wherein said core portion is disposed in fixed position on said one of said pair of preform mold bodies, said one of said pair of preform mold bodies being movable toward said one of said pair of preform finish blocks to move said core portion into said pocket to form said second mold cavity for said closure release element, whereby said one of said pair of preform mold bodies is retractable to move said core portion out of said pocket.

6. The apparatus as set forth in claim 4, wherein said core portion is movably mounted to said one of said pair of preform mold bodies for movement into said pocket to form said second mold cavity for said closure release element, whereby said core portion is retractable out of said pocket.

* * * * *